United States Patent
Yang et al.

(10) Patent No.: US 12,088,192 B2
(45) Date of Patent: Sep. 10, 2024

(54) CONTROLLER CHIP FOR A FLYBACK CONVERTER, CORRESPONDING FLYBACK CONVERTER AND SWITCHED-MODE POWER SUPPLY SYSTEM

(71) Applicant: SHANGHAI BRIGHT POWER SEMICONDUCTOR CO., LTD., Shanghai (CN)

(72) Inventors: Pengbo Yang, Shanghai (CN); Xiaoru Gao, Shanghai (CN)

(73) Assignee: SHANGHAI BRIGHT POWER SEMICONDUCTOR CO., LTD., Shanghai (CN)

( * ) Notice: Subject to any disclaimer, the term of this patent is extended or adjusted under 35 U.S.C. 154(b) by 227 days.

(21) Appl. No.: 17/942,955

(22) Filed: Sep. 12, 2022

(65) Prior Publication Data

US 2023/0082592 A1    Mar. 16, 2023

(30) Foreign Application Priority Data

Sep. 13, 2021    (CN) ......................... 202111066019.2

(51) Int. Cl.
     *H02M 1/15*      (2006.01)
     *H02M 1/00*      (2006.01)
     (Continued)

(52) U.S. Cl.
     CPC ........... *H02M 1/15* (2013.01); *H02M 1/0025* (2021.05); *H02M 1/44* (2013.01); *H02M 3/33523* (2013.01)

(58) Field of Classification Search
     CPC ........ H02M 1/15; H02M 1/0025; H02M 1/44; H02M 3/33523

(Continued)

(56) References Cited

U.S. PATENT DOCUMENTS

2003/0102851 A1*   6/2003   Stanescu ................. G05F 1/575
                                                                             323/280
2007/0159146 A1*   7/2007   Mandal ................... G05F 1/575
                                                                             323/280

(Continued)

FOREIGN PATENT DOCUMENTS

| CN | 103401431 A | 11/2013 |
|----|-------------|---------|
| CN | 109327146 A | 2/2019  |
| CN | 110320956 A | 10/2019 |

OTHER PUBLICATIONS

Cui, Qing et al., *Design of a Novel On-Chip Compensation for Boost Converter*, Microelectronics, No. 1 vol. 47, Feb. 2017, p. 63-66.

*Primary Examiner* — Yemane Mehari
(74) *Attorney, Agent, or Firm* — MUNCY, GEISSLER, OLDS & LOWE, PC

(57) ABSTRACT

A controller chip of a flyback converter, a flyback converter and a switched-mode power supply system are disclosed. In the controller chip, a current scaling module is added, which converts a feedback current signal at a feedback pin of the controller chip to allow compensation capacitor with a small capacitance to be integrated into the chip to constitute a required pole compensation module. In this way, a pole required by the feedback pin FB can be successfully provided in the chip. As a result, filtering of high-frequency noise in a feedback path in which the feedback pin FB is located can be achieved, reducing ripple in an output voltage generated by the flyback converter. Moreover, without changing a sampling gain and the compensation pole, it is allowed to greatly reduce the compensation capacitance, for example, to the order of 10 pF.

13 Claims, 6 Drawing Sheets

(51) Int. Cl.
*H02M 1/44* (2007.01)
*H02M 3/335* (2006.01)

(58) Field of Classification Search
USPC .......................................................... 363/13
See application file for complete search history.

(56) References Cited

U.S. PATENT DOCUMENTS

2011/0096574 A1* 4/2011 Huang ............... H02M 3/33507
363/21.18
2014/0266092 A1* 9/2014 Ueunten ................ H02M 3/158
327/74
2014/0300336 A1* 10/2014 Li ......................... H02M 3/156
323/285

* cited by examiner

CONTROLLER CHIP FOR A FLYBACK CONVERTER, CORRESPONDING FLYBACK CONVERTER AND SWITCHED-MODE POWER SUPPLY SYSTEM

CROSS-REFERENCE TO RELATED APPLICATION

This application claims the priority of Chinese patent application number 202111066019.2, filed on Sep. 13, 2021, the entire contents of which are incorporated herein by reference.

TECHNICAL FIELD

The present invention relates to switched-mode power supply technology and, in particular, to a controller chip of a flyback converter, a flyback converter and a switched-mode power supply system.

BACKGROUND

Referring to FIG. 1, an existing SSR (Secondary-side Synchronous Rectification) flyback converter usually employs an isolation voltage feedback circuit 11 (e.g., an opto-coupler component) to feed back an output voltage Vout of the SSR flyback converter. A controller chip 10 detects a conduction time or frequency of a power transistor (not shown) in the SSR flyback converter to eventually stabilize the output voltage Vout at a predetermined value. Additionally, in order to filter high-frequency noise in the feedback signal of the isolation voltage feedback circuit 11, it is necessary to set a pole in a feedback loop of the controller chip 10 to carry out the filtering.

Traditionally, such filtering compensation was generally accomplished by connecting an external capacitor C0 to an FB pin of the controller chip 10. Although this approach is simple, the external capacitor C0 leads to an increase in both the system's cost and failure rate.

SUMMARY OF THE INVENTION

It is an object of the present invention to provide a controller chip of a flyback converter, a flyback converter and a switched-mode power supply system, which enable to integrate a compensation capacitor in the chip and thus result in a reduction in both the system's cost and failure rate.

To this end, the present invention provides a controller chip of a flyback converter. The controller chip comprises a feedback pin. The feedback pin is connected to an isolation voltage feedback circuit that is external to the controller chip, the isolation voltage feedback circuit configured to feed back an output voltage of the flyback converter. The controller chip further comprises:
  a switching module, having a first terminal connected to the feedback pin and is configured to control an electric potential present at the feedback pin;
  a current scaling module, having a first terminal connected to a second terminal of the switching module and configured to scale a current signal flowing through the switching module; and
  pole compensation module comprising a compensation capacitor, wherein the compensation capacitor comprises a first terminal connected to a second terminal of the current scaling module and a second terminal grounded, and wherein the pole compensation module is configured to filter a high-frequency interference in a feedback path in which the feedback pin is located.

Optionally, the controller chip may further have an operating voltage pin, and the isolation voltage feedback circuit is connected between the operating voltage pin and the feedback pin. Alternatively, the controller chip may have a reference ground pin, the second terminal of the compensation capacitor is connected to the reference ground pin to be grounded, and the isolation voltage feedback circuit is connected between the reference ground pin and the feedback pin.

Optionally, the switching module may have a switching transistor, wherein when the isolation voltage feedback circuit is connected between the reference ground pin and the feedback pin, the switching transistor comprises a source terminal connected to the feedback pin, a drain terminal connected to the current scaling module, and a gate terminal configured to receive a first reference voltage; or when the isolation voltage feedback circuit is connected between the operating voltage pin and the feedback pin, the switching transistor comprises a drain terminal connected to the feedback pin, a source terminal connected the current scaling module, and a gate terminal configured to receive a second reference voltage.

Optionally, the pole compensation module may further comprise a compensation resistor which comprises a first terminal connected to a connection node of the compensation capacitor and the current scaling module, wherein a resistance of the compensation resistor is negatively correlated with a capacitance of the compensation capacitor.

Optionally, the controller chip may further have:
  a comparison module configured to compare a voltage signal output from the pole compensation module with a comparative reference voltage to generate a compensation signal; and
  a logic control module connected to the comparison module, wherein the logic control module is configured to generate a driving signal for turning on or off a power switching transistor in the flyback converter based on the compensation signal output from the comparison module.

Based on the same inventive idea, the present invention also provides a flyback converter, comprising:
  a voltage transformer having a primary-side winding and a secondary-side winding;
  a primary-side circuit configured to receive an input voltage, wherein the primary-side circuit comprises a power switching transistor connected to the primary-side winding of the voltage transformer;
  a secondary-side circuit, connected to the secondary-side winding of the voltage transformer and configured to provide an output voltage to a connected load;
  an isolation voltage feedback circuit, connected to an output terminal of the secondary-side circuit and configured to feed back the output voltage; and
  the controller chip, wherein the controller chip comprises a feedback pin, wherein the feedback pin is connected to the isolation voltage feedback circuit Optionally, the isolation voltage feedback circuit may comprise:
  a feedback resistor divider with an input terminal connected to the output terminal of the secondary-side circuit, wherein the feedback resistor divider is configured to receive, sample and divide the output voltage and then to feed back the divided voltage; and
  a voltage isolator connected between a voltage output terminal of the feedback resistor divider and the feedback pin of the controller chip, wherein the voltage isolator is configured to isolate and convert the voltage output from the feedback resistor divider, which is then transmitted to the controller chip.

Optionally, the voltage isolator may comprise an opto-coupler component.

Based on the same inventive idea, the present invention also provides a switched-mode power supply system comprising:

the flyback converter as defined hereinabove; and
a load connected to the voltage output terminal of the flyback converter.

The techniques provided in the present invention provide at least one of the following advantages over the prior art:

1. Through adding the current scaling module to the controller chip for converting the feedback current signal at the feedback pin of the controller chip to allow a compensation capacitor with a small capacitance to be integrated into the chip to constitute required pole compensation module, thus a pole required by the feedback loop is successively provided in the chip. As a result, filtering of the high-frequency noise in the feedback path is achieved, preventing ripple in the output voltage generated by the flyback converter.

2. Without changing a sampling gain and the compensation pole, it is allowed to simultaneously modify the compensation capacitor and the compensation resistor that constitute the pole compensation module, and the higher resistance of the compensation resistor, the lower capacitance of the compensation capacitor. In this way, the capacitance of the compensation capacitor can be greatly reduced, for example, to the order of 10 pF. This allows the compensation capacitor to be integrated into the chip, thereby reducing both the system's cost and failure rate.

DETAILED DESCRIPTION

The technique solutions proposed in the present invention will be described in greater detail below with reference to the accompanying drawings and specific embodiments. From the following description, advantages and features of the present invention will become more apparent. Note that the drawings are provided in a very simplified form not necessarily drawn to exact scale for the only purpose of helping to explain the disclosed examples in a more convenient and clearer way.

Figure 2:
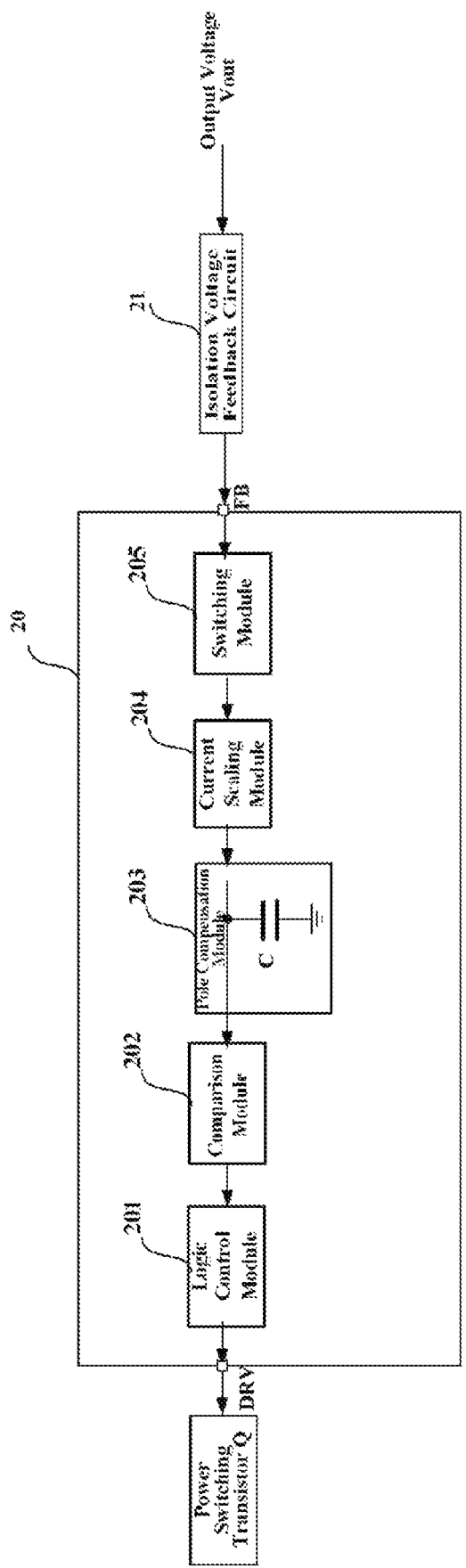
FIG. 2 is a system block diagram of a controller chip of a flyback converter according to a particular embodiment of the present invention.

Referring to FIG. 2, in an embodiment of the present invention, a controller chip 20 of a flyback converter is provided. The controller chip 20 comprises a feedback pin FB and is provided therein with a logic control module 201, a comparison module 202, a pole compensation module 203, a current scaling module 204 and a switching module 205 connected in a sequence. The feedback pin FB is connected to an external isolation voltage feedback circuit 21 configured to feed back an output voltage Vout of the flyback converter. The switching module 205 comprises one terminal connected to the feedback pin FB, and is configured to control an electric potential at the feedback pin FB. The current scaling module 204 comprises one terminal connected to another terminal of the switching module 205, and is configured to scale a current signal flowing through the switching module 205. The pole compensation module 203 comprises a compensation capacitor C. One terminal of the compensation capacitor C is connected to another terminal of the current scaling module 204, and another terminal of the compensation capacitor C is grounded. The pole compensation module 203 is configured to filter a high-frequency interference in a feedback path in which the feedback pin FB is located. The comparison module 203 is configured to draw a comparison between a voltage signal output from the pole compensation module 203 and a comparative reference voltage (e.g., Vref in FIGS. 3 and 4), to obtain a compensation signal (not shown). The logic control module 201 is connected to an output terminal of the comparison module 202 and is configured to generate a driving signal for turning on or off a power switching transistor Q in the flyback converter based on the compensation signal output from the comparison module 202. The driving signal is transmitted through a drive pin DRV to a gate terminal of the power switching transistor Q.

Figure 3:
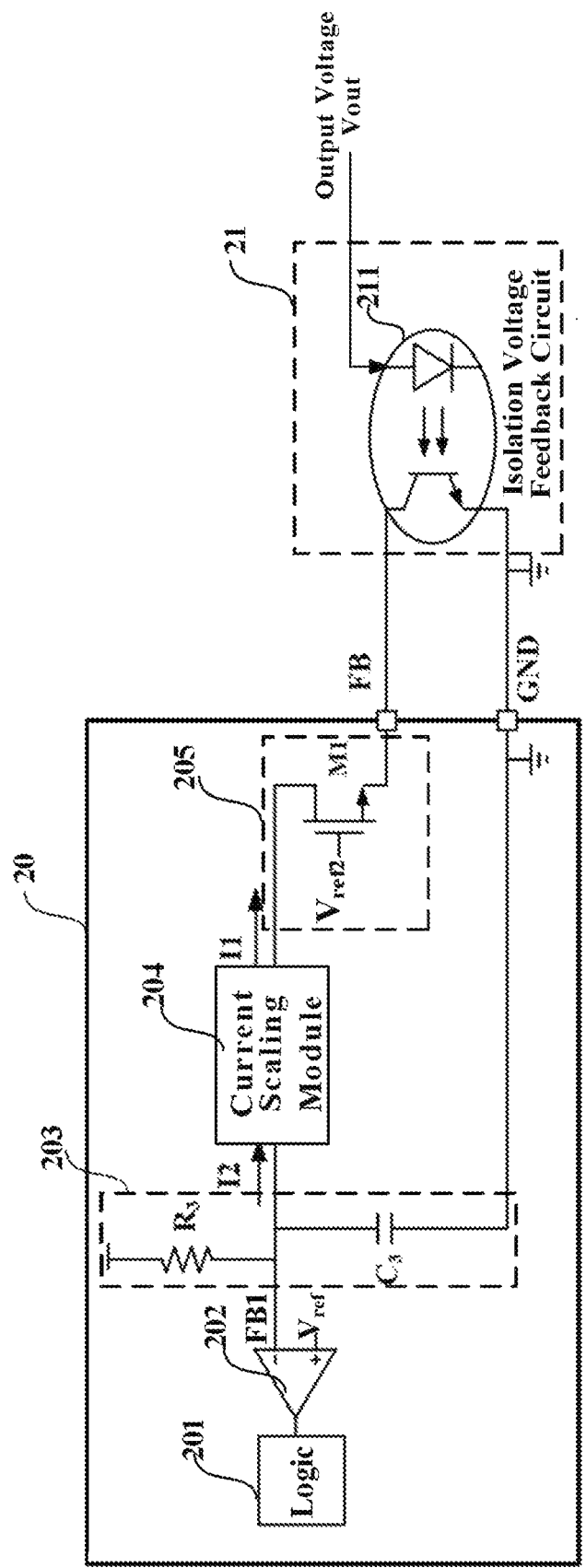
FIG. 3 is an exemplary schematic diagram showing the structure of an internal circuit of the controller chip of FIG. 2.

As an example, referring to FIG. 3, in the present embodiment, the controller chip 20 comprises a reference ground pin GND, and the switching module 205 includes a switching transistor M1 (which may be a MOS transistor or triode). Moreover, the isolation voltage feedback circuit 21 includes an opto-coupler component 211. The output voltage Vout is received at a control terminal of the isolation voltage feedback circuit 21, and another terminal of the isolation voltage feedback circuit 21 is connected to the feedback pin FB of the controller chip 20. Yet another terminal of the isolation voltage feedback circuit 21 is connected to the reference ground pin GND of the controller chip 20. The opto-coupler component can be replaced with another isolation component that isolates and transmits the received output voltage Vout to the controller chip 20. When the switching transistor M1 is a PMOS transistor, the switching transistor M1 comprises a source terminal connected to the feedback pin FB, a drain terminal connected to an output terminal of the current scaling module 204, and a gate terminal to receive a first reference voltage $V_{ref2}$. The pole compensation module includes a compensation resistor R3 and a compensation capacitor C3. One terminal of the compensation resistor R3 is coupled to an operating voltage of the chip (e.g., VCC in FIG. 4), and another terminal of the compensation resistor R3 is connected to one terminal of the compensation capacitor C3, thus providing a pole in the pole compensation module 203. The pole compensation module 203 is connected to an input terminal of the comparison module 202 and an input terminal of the current scaling module 204.

In this example, a current scaling factor of the current scaling module 204 and a capacitance of the compensation capacitor C3 are chosen according to the principles detailed below.

The controller chip 20 controls the electric potential at the feedback pin FB using the switching transistor M1, ensuring that the opto-coupler or a similar component in the isolation voltage feedback circuit 21 operates within a normal range. Moreover, a current signal I1 generated by the isolation voltage feedback circuit 21 is scaled by the current scaling module 204 and then generates a voltage drop across the compensation resistor R3. In this way, it is converted to a voltage FB1 which satisfies FB1=VCC−I2*R3 and is provided to the comparison module 202. The current scaling factor of the current scaling module 204 is set to 1/B, where B>1 and I2/I1=1/B. In this way, apart from a transimpedance gain from 12 to FB1 (i.e., any value in the range from a required minimum to maximum resistance value of R3), the compensation resistance R3 can be increased by B times. Moreover, since the pole is provided together by the compensation resistor R3 and the compensation capacitor C3, while maintaining the position of the pole in the pole compensation module 203 (e.g., the resistance of the compensation resistor R3 is inversely proportional to the capacitance of the compensation capacitor C3, and the product of them is a constant value), the compensation resistance R3 can be increased by B times, and the compensation capacitance C3 can be decreased by B times. In some other embodiments, it is also possible to change the position of the pole in the pole compensation module 203 within a narrow range by increasing the compensation resistance R3 and correspondingly decreasing the compensation capacitance C3. That is, the variation of the compensation resistance R3 is negatively correlated with the variation of the compensation capacitance C3. As a result, the feedback compensation capacitance can also be greatly reduced.

Figure 1:
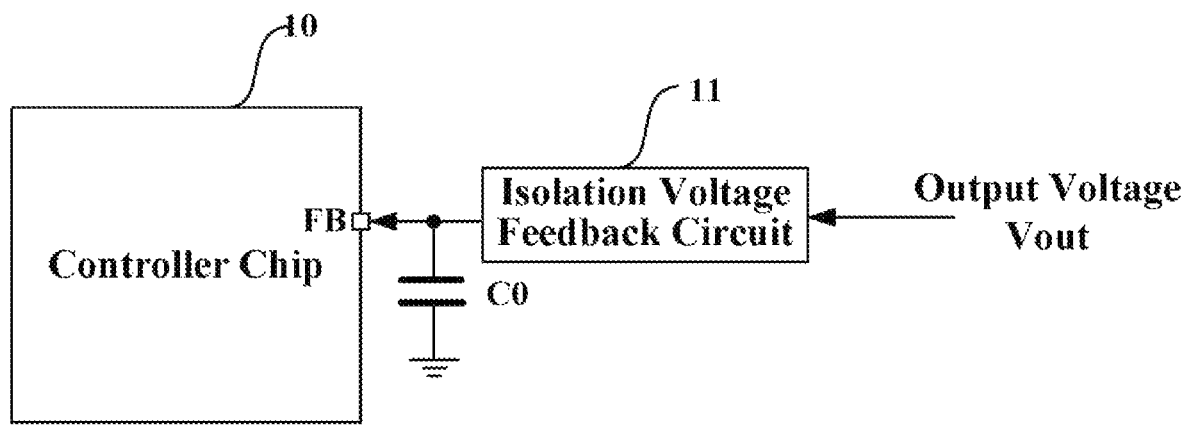
FIG. 1 is a schematic circuit diagram of an existing SSR flyback converter.

For example, the capacitor C0 generally has a capacitance of an order of nF in the prior art as shown in FIG. 1. In an example of the present invention, if the current scaling factor of the current scaling module 204, i.e., 1/B, is approximately 0.01, then B will be about 100. In this example, the compensation resistance R3 can be increased by approximately 100 times that of the prior art, and at the same time, the compensation capacitance C3 can be reduced approximately by 100 times. Thus, the capacitance is reduced to the order of 10 pF, thus achieving the purpose of significantly reducing the capacitance of the feedback compensation capacitor. As a result, it is made easier to integrate the compensation capacitor into the controller chip 20, leading to a reduction in both the system's cost and failure rate.

Figure 4:
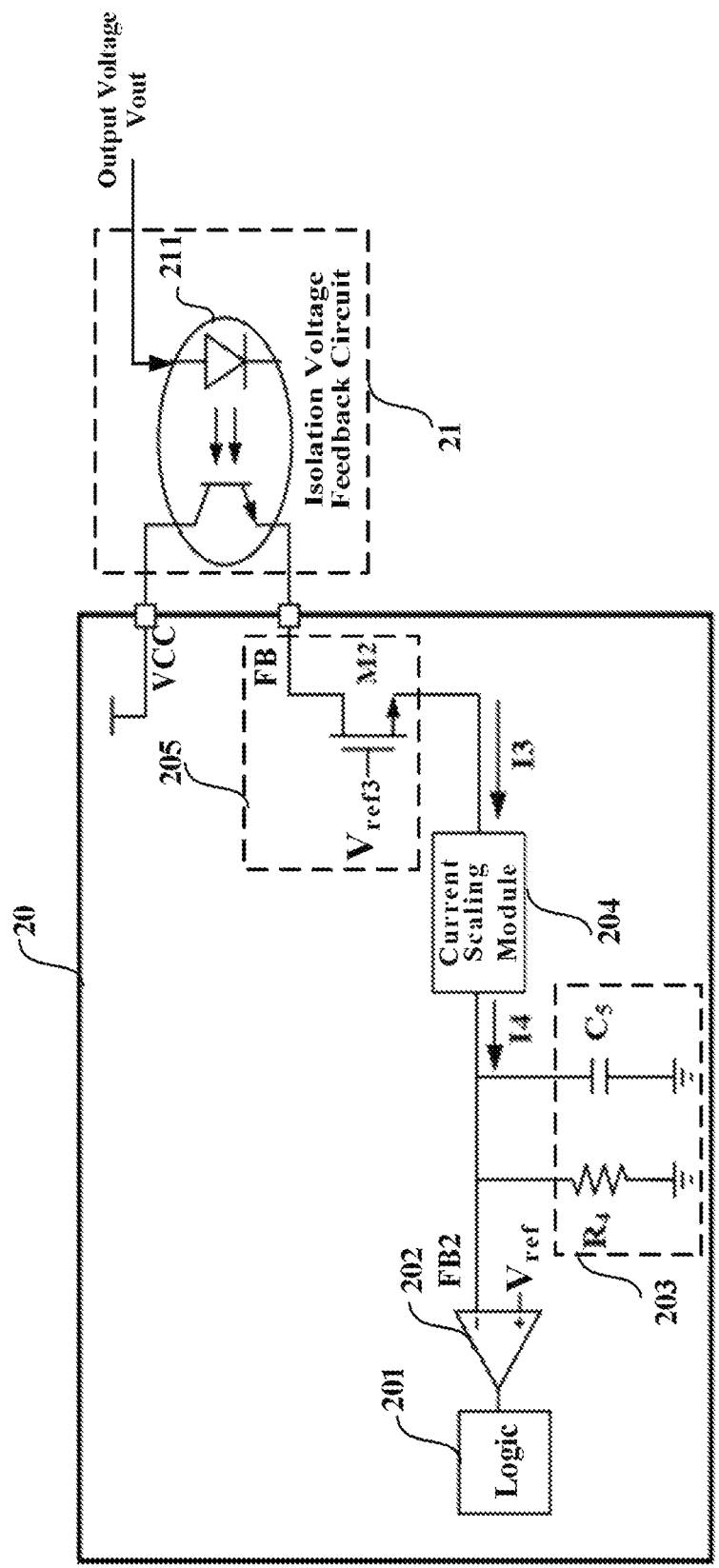
FIG. 4 is another exemplary schematic diagram showing the structure of the internal circuit of the controller chip of FIG. 2.

As another example, referring to FIG. 4, in the present embodiment, the controller chip 20 comprises an operating voltage pin VCC, and the switching module 205 includes a switching transistor M2 (which may be a MOS transistor or triode). The isolation voltage feedback circuit 21 includes an opto-coupler component or another isolation signal transmission component 211. The output voltage Vout is received at an input terminal of the isolation voltage feedback circuit 21, and another terminal thereof is connected to the feedback pin FB of the controller chip 20. Yet another terminal of the isolation voltage feedback circuit 21 is connected to the operating voltage pin VCC of the controller chip 20. In case of the switching transistor M1 being implemented as a PMOS transistor, the switching transistor M1 comprises a drain terminal connected to the feedback pin FB, a source terminal connected to the input terminal of the current scaling module 204, and a gate terminal configured to receive a second reference voltage $V_{ref3}$. The pole compensation module 203 includes a compensation resistor R4 and a compensation capacitor C5. Both the compensation resistor R4 and the compensation capacitor C5 have a grounded terminal. Another terminal of the compensation resistor R4 is connected to another terminal of the compensation capacitor C5 so that they together provide a pole in the pole compensation module 203. The pole compensation module 203 is connected to the input terminal of the comparison module 202 and to the output terminal of the current scaling module 204.

In this example, the current scaling factor of the current scaling module 204 and a capacitance of the compensation capacitor C3 are chosen according to the principles detailed below.

The controller chip 20 controls the electric potential at the feedback pin FB using the switching transistor M1, ensuring that the opto-coupler or a similar component in the isolation voltage feedback circuit 21 operates within a normal range. Moreover, a current signal generated by the isolation voltage feedback circuit 21 is scaled by the current scaling module 204, creating an electric potential FB2 across the compensation resistor R4, and provided to the comparison module 202. The current scaling factor of the current scaling module 204 is set to 1/A, where A>1 and I4/I3=1/A. In this way, while maintaining a transimpedance gain from 14 to FB2 (i.e, for any resistance of R4 in the range from a required minimum to maximum value), the compensation resistance R4 can be increased by A times. Moreover, since the pole is provided together by the compensation resistor R4 and the compensation capacitor C5, while maintaining the position of the pole in the pole compensation module 203 (e.g., the resistance of the compensation resistor R4 is inversely proportional to the capacitance of the compensation capacitor C5, and the product of them is a constant), the compensation resistance R4 can be increased by A times, and the compensation capacitance C5 can be decreased by A times.

For example, the capacitor C0 generally has a capacitance of an order of nF in the prior art as shown in FIG. 1. In an example of the present invention, if the current scaling factor of the current scaling module 204, i.e., 1/A, is approximately 0.01, then A will be about 100. In this way, the compensation resistance R4 can be increased by approximately 100 times that of the prior art, and at the same time, the compensation capacitance C5 can be reduced by approximately 100 times. Thus, the capacitance is reduced to the order of 10 pF, thus achieving the purpose of significantly reducing the capacitance of the feedback compensation capacitor. As a result, it is made easier to integrate the compensation capacitor into the controller chip 20, leading to a reduction in both the system's cost and failure rate.

In other words, in the present embodiment, to maintain the pole in the pole compensation module 203 at a constant position, the resistance of the compensation resistor chosen is negatively correlated with the capacitance of the compensation capacitor chosen. That is, the higher the resistance of the compensation resistor, the lower the capacitance of the compensation capacitor.

It should be noted that, in the pole compensation module 203 of the present invention, the resistance of the compensation resistor and the capacitance of the compensation capacitor may be either constant or variable. Moreover, the compensation resistance may be provided by either a resistor or a MOS transistor or a similar device operating in a variable resistance region.

Figure 5:
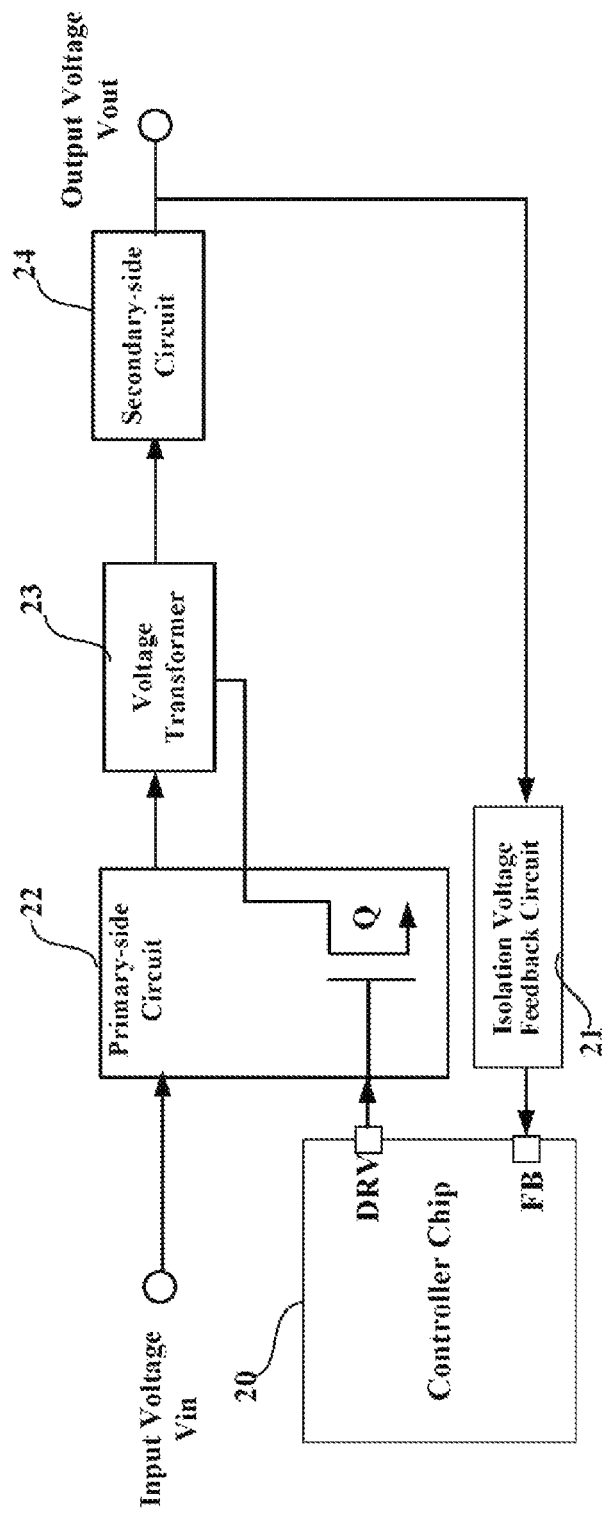
FIG. 5 is a schematic diagram showing a circuit structure of a flyback converter according to a particular embodiment of the present invention.
Figure 6:
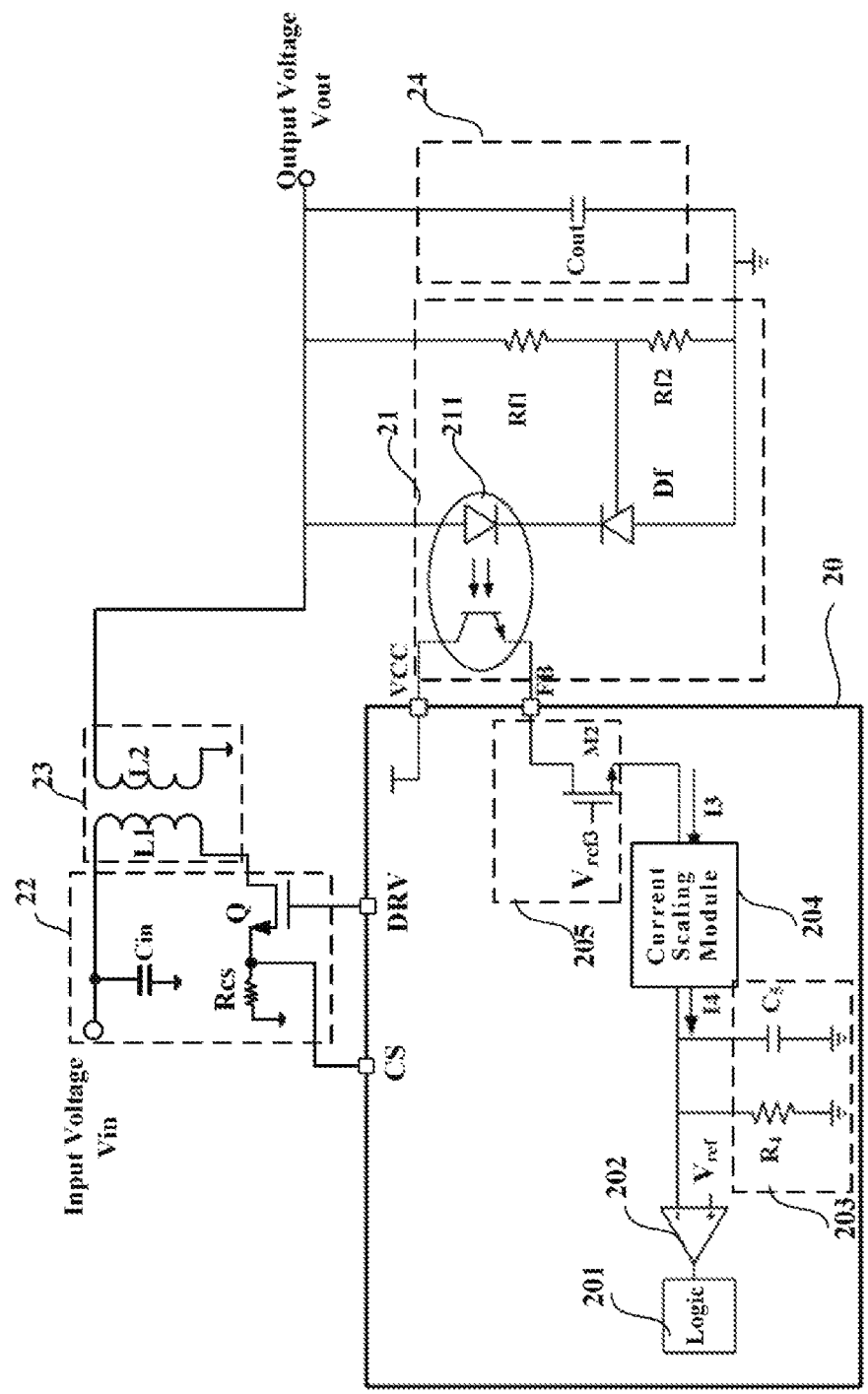
FIG. 6 is an exemplary schematic diagram of the circuit structure of the flyback converter of FIG. 5.

Based on the same idea, referring to FIG. 5, in an embodiment of the present invention, there is also provided a flyback converter including the controller chip 20 of the present invention, the isolation voltage feedback circuit 21, a primary-side circuit 22, a voltage transformer 23 and a secondary-side circuit 24. As shown in FIG. 6, the voltage transformer 23 includes a primary-side winding L1 and a secondary-side winding L2. The primary-side circuit 22 receives an input voltage Vin and comprises a power switching transistor Q connected to the primary-side winding L1 in the voltage transformer 23. The secondary-side circuit 24 is connected to the secondary-side winding L2 in the voltage transformer 23 and provides an output voltage Vout to a corresponding load (not shown). The controller chip 20 comprises at least a feedback pin FB and a drive pin DRV. The isolation voltage feedback circuit 21 is connected to an output terminal of the secondary-side circuit 24 and the feedback pin FB of the controller chip 20 in order to provide a feedback output voltage Vout to the controller chip 20. The drive pin DRV of the controller chip 20 is connected to a control terminal of the power switching transistor Q in the primary-side circuit 22 (e.g., a gate of a MOS device). Thus, a driving signal for turning on or off the power switching transistor Q can be generated based on a signal present at the feedback pin FB, thereby eliminating ripple in the output voltage Vout.

Optionally, referring to FIG. 6, the isolation voltage feedback circuit 21 includes a feedback resistor divider and a voltage isolator 211. The voltage isolator 211 is connected between a voltage output terminal of the feedback resistor divider and the feedback pin FB of the controller chip 20 and is configured to isolate and convert a voltage output from the feedback resistor divider and then to transmit it to the controller chip 20.

As an example, referring to FIG. 6, the feedback resistor divider includes voltage divider resistors Rf1 and Rf2 and a three-terminal diode Df. The Voltage divider resistors Rf1 and Rf2 are connected in series, and one terminal of the voltage divider resistor Rf1 is connected to the output terminal of the secondary-side circuit 24 in order to receive the output voltage Vout. Another terminal of the voltage divider resistor Rf2 is grounded, and a series connection node of the voltage divider resistors Rf1 and Rf2 serves as the voltage output terminal of the feedback resistor divider, from which a divided voltage signal (not shown) resulting from division of the output voltage Vout is output. A control terminal of the three-terminal diode Df is connected to the series connection node of the voltage divider resistors Rf1 and Rf2. Moreover, an anode of the diode is grounded, and a cathode thereof is connected to one terminal of the voltage isolator 211. The three-terminal diode Df is turned on or off under the control of the divided voltage signal, enabling the voltage isolator 211 to output a corresponding feedback signal. The voltage isolator 211 is an opto-coupler component including a light-emitting diode. The output voltage Vout is received at an anode of the light-emitting diode, and a cathode of the light-emitting diode is connected to the cathode of the three-terminal diode Df. A collector of a phototriode in the opto-coupler component is connected to the operating voltage pin VCC of the control chip 20, and an emitter of the phototriode is connected to the feedback pin FB of the control chip 20.

It should be noted that, in some other embodiments of the present invention, the voltage isolator 211 may be implemented as a triode. The output voltage Vout may be received at a base terminal of the triode. A collector terminal of the triode may be connected to the operating voltage pin VCC of the control chip 20, and an emitter terminal of the triode may be connected to the feedback pin FB of the control chip 20.

In an alternative embodiment of the present invention, the voltage isolator 211 may include a triode and an opto-coupler component. As an example, the triode in the voltage isolator 211 may directly replace the three-terminal diode Df of FIG. 6. In this case, a base terminal of the triode is connected to the series connection node of the voltage divider resistors Rf1 and Rf2. An emitter terminal of the triode is grounded, and a collector terminal of the triode is connected to a cathode of a light-emitting diode in the opto-coupler.

As an example, referring to FIG. 6, in addition to the power switching transistor Q, the primary-side circuit 22 further includes a rectifier filter circuit and a current sampling circuit. The rectifier filter circuit may include a rectifier diode and a filtering capacitor Cin. The rectifier filter circuit is configured to receive the input voltage Vin, and then rectify and filter it. The current sampling circuit is connected between the power switching transistor Q and a current detection pin CS of the controller chip 20 and is configured to detect a peak current in the primary-side circuit 22. The current sampling circuit may include a sampling resistor Rcs which is connected to a source of the power switching transistor Q at one terminal and grounded at another terminal.

As an example, referring to FIG. 6, the secondary-side circuit 24 includes an output filtering circuit configured to filter the output voltage Vout. The output filtering circuit may include a filtering capacitor Cout.

It should be noted that the above-described specific circuit implementations of the primary-side circuit 22, the secondary-side circuit 24 and the isolation voltage feedback circuit 21 are merely exemplary without implying that the present invention is limited to those examples. Any person skilled in the art can select any well-known proper circuit structures as the primary-side circuit 22, the secondary-side circuit 24 and the isolation voltage feedback circuit 21. For example, a clamping circuit may be further provided in the primary-side circuit 22, a Zener diode in the secondary-side circuit 24, and so forth.

Based on the same inventive idea, referring to FIGS. 2 to 6, in an embodiment of the present invention, there is also provided a switched-mode power supply system including the flyback converter as defined herein and a load connected to the voltage output terminal of the flyback converter. The output voltage Vout output from the flyback converter can be used to power the load.

In summary, the controller chip of the flyback converter, flyback converter and switched-mode power supply system of the present invention, through adding the current scaling module to the controller chip, enables conversion of the feedback current signal at the feedback pin of the controller chip. This allows a compensation capacitor with a small capacitance to be integrated into the chip to constitute a required pole compensation module. Thus, a pole required at the feedback pin FB is successfully provided in the chip. As a result, filtering of high-frequency noise in the feedback path in which the feedback pin FB is located is achieved, reducing ripple in the output voltage of the flyback converter. Moreover, without changing the sampling gain and the compensation pole, it is allowed to simultaneously modify the compensation capacitor and the compensation resistor that constitute the pole compensation module: the higher the resistance of the compensation resistor, the lower the capacitance of compensation capacitor. In this way, the capacitance of the compensation capacitor can be greatly reduced, for example, to the order of 10 pF. This allows the compensation capacitor to be integrated into the chip, thereby reducing both the system's cost and failure rate.

The description presented above is merely that of some preferred embodiments of the present invention and is not intended to limit the scope thereof in any sense. Any and all changes and modifications made by those of ordinary skill in the art based on the above teachings fall within the scope as defined in the appended claims.

What is claimed is:

1. A controller chip for a flyback converter, wherein the controller chip comprises a feedback pin, wherein the feedback pin is connected to an isolation voltage feedback circuit that is external to the controller chip, the isolation voltage feedback circuit configured to feed back an output voltage of the flyback converter, and wherein the controller chip further comprises:
a switching module, having a first terminal connected to the feedback pin and configured to control an electric potential present at the feedback pin;
a current scaling module, having a first terminal connected to a second terminal of the switching module and configured to scale a current signal flowing through the switching module; and
a pole compensation module comprising a compensation capacitor, wherein the compensation capacitor comprises a first terminal connected to a second terminal of the current scaling module and a second terminal grounded, and wherein the pole compensation module is configured to filter a high-frequency interference in a feedback path in which the feedback pin is located.

2. The controller chip of claim 1, wherein the controller chip further comprises an operating voltage pin, and the isolation voltage feedback circuit is connected between the operating voltage pin and the feedback pin; or wherein the controller chip comprises a reference ground pin, the second terminal of the compensation capacitor is connected to the reference ground pin to be grounded, and the isolation voltage feedback circuit is connected between the reference ground pin and the feedback pin.

3. The controller chip of claim 2, wherein the switching module comprises a switching transistor, and wherein when the isolation voltage feedback circuit is connected between the reference ground pin and the feedback pin, the switching transistor comprises a source terminal connected to the feedback pin, a drain terminal connected to the current scaling module, and a gate terminal configured to receive a first reference voltage; or when the isolation voltage feedback circuit is connected between the operating voltage pin and the feedback pin, the switching transistor comprises a drain terminal connected to the feedback pin, a source terminal connected to the current scaling module, and a gate terminal configured to receive a second reference voltage.

4. The controller chip of claim 1, wherein the pole compensation module further comprises a compensation resistor which comprises a first terminal connected to a connection node of the compensation capacitor and the current scaling module, and wherein a resistance of the compensation resistor is negatively correlated with a capacitance of the compensation capacitor.

5. The controller chip of claim 1, further comprises:
a comparison module configured to compare a voltage signal output from the pole compensation module with a comparative reference voltage to generate a compensation signal; and
a logic control module connected to the comparison module, wherein the logic control module is configured to generate a driving signal for turning on and off a power switching transistor in the flyback converter based on the compensation signal output from the comparison module.

6. A flyback converter, comprising:
a voltage transformer having a primary-side winding and a secondary-side winding;
a primary-side circuit configured to receive an input voltage, wherein the primary-side circuit comprises a power switching transistor connected to the primary-side winding of the voltage transformer;
a secondary-side circuit, connected to the secondary-side winding of the voltage transformer and configured to provide an output voltage to a connected load;
an isolation voltage feedback circuit, connected to an output terminal of the secondary-side circuit and configured to feed back the output voltage; and
a controller chip, wherein the controller chip comprises a feedback pin, wherein the feedback pin is connected to an isolation voltage feedback circuit that is external to the controller chip, the isolation voltage feedback circuit configured to feed back an output voltage of the flyback converter, and wherein the controller chip further comprises:
a switching module, having a first terminal connected to the feedback pin and configured to control an electric potential present at the feedback pin;
a current scaling module, having a first terminal connected to a second terminal of the switching module and configured to scale a current signal flowing through the switching module; and
a pole compensation module comprising a compensation capacitor, wherein the compensation capacitor comprises a first terminal connected to a second terminal of the current scaling module and a second terminal grounded, and wherein the pole compensation module is configured to filter a high-frequency interference in a feedback path in which the feedback pin is located,
wherein the feedback pin of the controller chip is connected to the isolation voltage feedback circuit.

7. The flyback converter of claim 6, wherein the controller chip further comprises an operating voltage pin, and the isolation voltage feedback circuit is connected between the operating voltage pin and the feedback pin; or wherein the controller chip comprises a reference ground pin, the second terminal of the compensation capacitor is connected to the reference ground pin to be grounded, and the isolation voltage feedback circuit is connected between the reference ground pin and the feedback pin.

8. The flyback converter of claim 7, wherein the switching module comprises a switching transistor, and wherein when the isolation voltage feedback circuit is connected between the reference ground pin and the feedback pin, the switching transistor comprises a source terminal connected to the feedback pin, a drain terminal connected to the current scaling module, and a gate terminal configured to receive a first reference voltage; or when the isolation voltage feedback circuit is connected between the operating voltage pin and the feedback pin, the switching transistor comprises a drain terminal connected to the feedback pin, a source terminal connected to the current scaling module, and a gate terminal configured to receive a second reference voltage.

9. The flyback converter of claim 6, wherein the pole compensation module further comprises a compensation resistor which comprises a first terminal connected to a connection node of the compensation capacitor and the current scaling module, wherein a resistance of the compensation resistor is negatively correlated with a capacitance of the compensation capacitor.

10. The flyback converter of claim 6, further comprises:
- a comparison module configured to compare a voltage signal output from the pole compensation module with a comparative reference voltage to generate a compensation signal; and
- a logic control module connected to the comparison module, wherein the logic control module is configured to generate a driving signal for turning on and off a power switching transistor in the flyback converter based on the compensation signal output from the comparison module.

11. The flyback converter of claim 6, wherein the isolation voltage feedback circuit comprises:
- a feedback resistor divider with an input terminal connected to the output terminal of the secondary-side circuit, wherein the feedback resistor divider is configured to receive, sample and divide the output voltage and then to feed back the divided voltage; and
- a voltage isolator connected between a voltage output terminal of the feedback resistor divider and the feedback pin of the controller chip, wherein the voltage isolator is configured to isolate and convert the voltage output from the feedback resistor divider, which is then transmitted to the controller chip.

12. The flyback converter of claim 11, wherein the voltage isolator comprises an opto-coupler component.

13. A switched-mode power supply system, comprising:
- the flyback converter of claim 6; and
- a load connected to the voltage output terminal of the flyback converter.

* * * * *